US009416014B2

(12) United States Patent
Ishii et al.

(10) Patent No.: US 9,416,014 B2
(45) Date of Patent: Aug. 16, 2016

(54) METHOD FOR PRODUCING TRICHLOROSILANE

(71) Applicant: MITSUBISHI MATERIALS CORPORATION, Tokyo (JP)

(72) Inventors: Toshiyuki Ishii, Yokkaichi (JP); Hideo Ito, Kuwana (JP); Yuji Shimizu, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/929,873

(22) Filed: Nov. 2, 2015

(65) Prior Publication Data

US 2016/0052791 A1    Feb. 25, 2016

Related U.S. Application Data

(62) Division of application No. 12/226,202, filed as application No. PCT/JP2007/070644 on Oct. 23, 2007, now abandoned.

(30) Foreign Application Priority Data

Oct. 31, 2006   (JP) .................................. 2006-297034
Oct. 3, 2007    (JP) .................................. 2007-259445

(51) Int. Cl.
   *C01B 33/107*   (2006.01)
   *B01J 12/00*    (2006.01)
   (Continued)

(52) U.S. Cl.
   CPC ........... *C01B 33/1071* (2013.01); *B01J 12/007* (2013.01); *B01J 19/02* (2013.01);
   (Continued)

(58) Field of Classification Search
   CPC .................. C01B 33/1071; C01B 33/10757; B01J 19/243
   See application file for complete search history.

(56) References Cited

U.S. PATENT DOCUMENTS 2,145,084 A    1/1939   Hersey
4,536,642 A    8/1985   Hamster et al.
(Continued)

FOREIGN PATENT DOCUMENTS

EP    1454670 A1    9/2004
EP    1775263 A1    4/2007
(Continued)

OTHER PUBLICATIONS

International Search Report mailed Jan. 29, 2008, issued on PCT/JP2007/070644.
(Continued)

*Primary Examiner* — Jonathan Hurst
(74) *Attorney, Agent, or Firm* — Locke Lord LLP

(57) ABSTRACT

An apparatus for producing trichlorosilane, including: a reaction vessel in which a supply gas containing silicon tetrachloride and hydrogen is supplied to produce a reaction product gas containing trichlorosilane and hydrogen chloride; a heating mechanism that heats the interior of the reaction vessel; a gas supply section that supplies the supply gas in the reaction vessel; and a gas discharge section that discharges the reaction product gas from the reaction vessel to the outside, wherein a reaction passageway is formed in the interior of the reaction vessel, in which a plurality of small spaces partitioned by a plurality of reaction tubular walls that have different inner diameters and are substantially concentrically disposed communicate by flow penetration sections formed alternately in lower portions and upper portions of the reaction tubular walls in order from the inside, and the gas supply section and the gas discharge section are connected to the reaction passageway.

10 Claims, 3 Drawing Sheets

(51) Int. Cl.
  *B01J 19/02* (2006.01)
  *B01J 19/24* (2006.01)
(52) U.S. Cl.
  CPC ..... *B01J 19/243* (2013.01); *B01J 2219/00135* (2013.01); *B01J 2219/00155* (2013.01); *B01J 2219/0272* (2013.01)

(56) References Cited

U.S. PATENT DOCUMENTS

| | | |
|---|---|---|
| 4,668,493 A | 5/1987 | Levin |
| 4,737,348 A | 4/1988 | Levin |
| 5,906,799 A | 5/1999 | Burgie et al. |

FOREIGN PATENT DOCUMENTS

| | | |
|---|---|---|
| FR | 656 254 A | 5/1929 |
| JP | 57-012826 | 1/1982 |
| JP | 57-156318 | 9/1982 |
| JP | 60-122714 | 7/1985 |
| JP | 62-021706 | 1/1987 |
| JP | 62-123011 | 6/1987 |
| JP | 3781439 | 10/1994 |
| JP | 09-157073 | 6/1997 |

OTHER PUBLICATIONS

Supplementary European Search Report for European Patent Application No. EP 07830378.1 issued Jan. 14, 2011.

METHOD FOR PRODUCING TRICHLOROSILANE

CROSS REFERENCE TO RELATED APPLICATIONS

This application is a divisional application of U.S. application Ser. No. 12/226,202 filed Oct. 10, 2008. This application is a divisional of an application which is related to three other applications: "APPARATUS FOR PRODUCING TRICHLOROSILANE" filed in the names of Toshiyuki ISHI, Hideo ITO, Yuji SHIMIZU as a national phase entry of PCT/JP2007/070715 filed Oct. 24, 2007 (U.S. Pat. No. 7,964,155, granted Jun. 21, 2011); "APPARATUS FOR PRODUCING TRICHLOROSILANE" filed in the names of Toshiyuki ISHI, Hideo ITO, Yuji SHIMIZU as a national phase entry of PCT/JP2007/070725 filed Oct. 24, 2007 (U.S. Ser. No. 12/226,204 filed Oct. 10, 2008); and "APPARATUS FOR PRODUCING TRICHLOROSILANE" filed in the names of Toshiyuki ISHI, Hideo ITO, Yuji SHIMIZU as a national phase entry of PCT/JP2007/070843 filed Oct. 25, 2007 (U.S. Pat. No. 7,998,428 granted Aug. 16, 2011); which applications are assigned to the assignee of the present application and all three incorporated by reference herein.

TECHNICAL FIELD

The present invention relates to an apparatus for producing trichlorosilane, which converts silicon tetrachloride into trichlorosilane.

This application claims priority on Japanese Patent Application No. 2006-297034, filed Oct. 31, 2006, and on Japanese Patent Application No. 2007-259445, filed Oct. 3, 2007, the disclosure of which is incorporated by reference herein.

BACKGROUND ART

Trichlorosilane ($SiHCl_3$), which is used as a raw material for the production of highly pure silicon (Si), can be produced by conversion through a reaction of silicon tetrachloride ($SiCl_4$: tetrachlorosilane) with hydrogen.

In other words, silicon is produced by the reductive reaction and the thermolysis reaction of trichlorosilane represented by reaction schemes (1) and (2) shown below, and trichlorosilane is produced by the conversion reaction represented by reaction scheme (3) shown below.

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 + HCl \quad (3)$$

As an apparatus for producing this trichlorosilane, for example, Patent Document 1 (Japanese Patent No. 3,781,439) proposes a reactor in which a reaction chamber surrounded by a heating element is of a dual chamber design having an outer chamber and an inner chamber formed by two concentrically positioned pipes, a supply gas of hydrogen and silicon tetrachloride is supplied to the reaction chamber from below via a heat exchanger disposed in the bottom of this reaction chamber, and a reaction product gas is discharged from the reaction chamber in a downward direction. In this reactor, the supply gas supplied to the outer chamber is heated by a heating element thereby converting into a reaction product gas, which is introduced into the inner chamber via a diverter and then discharged.

DISCLOSURE OF THE INVENTION

The following problems remain in the prior art described above.

Namely, in the above conventional apparatus for producing trichlorosilane, since the supply gas introduced into the outer chamber is discharged after the gas flow being made opposite by the diverter in the upper portion and the supply gas flowing in the inner chamber, the apparatus has a short gas passageway and has a structure that it is difficult to obtain sufficient retention time and heating required to obtain a sufficient conversion reaction. With such a structure, it is required to further increase the length of a dual pipe forming a reactor so as to increase the length of the gas passageway. In this case, there is a disadvantage that the size of the entire apparatus increases.

In light of these problems, the present invention has been made and an object thereof is to provide an apparatus for producing trichlorosilane in which a long gas passageway required to the conversion reaction can be obtained without increasing the size of the entire apparatus, and also sufficient retention time and heating can be obtained.

The present invention employed the following constitution so as to solve the above problems. Namely, the apparatus for producing trichlorosilane of the present invention includes: a reaction vessel in which a supply gas containing silicon tetrachloride and hydrogen is supplied to produce a reaction product gas containing trichlorosilane and hydrogen chloride; a heating mechanism that heats the interior of the reaction vessel; a gas supply section that supplies the supply gas in the reaction vessel; and a gas discharge section that discharges the reaction product gas from the reaction vessel to the outside, wherein a reaction passageway is formed in the interior of the reaction vessel, in which a plurality of small spaces partitioned by a plurality of reaction tubular walls that have different inner diameters and are substantially concentrically disposed communicate by penetration sections formed alternately in lower portions and upper portions of the reaction tubular walls in order from the inside, and the gas supply section and the gas discharge section are connected to the reaction passageway.

In this apparatus for producing trichlorosilane, the supply gas supplied to the reaction passageway in the reaction tubular walls sequentially flows into an outer or inner space partitioned by the reaction tubular walls via a flow penetration section while being heated, and is converted into a reaction product gas through the reaction. In this case, since the flow penetration sections are alternately formed in upper portions and lower portions of the reaction tubular walls in order from the inside, the flow direction of the gas repetitively changes between downward direction and upward direction, alternately, every time the gas moves to the outer or inner small space. Therefore, the long reaction passageway is ensured in the reaction vessel and the heat conducting area increases by a plurality of reaction tubular walls, and thus sufficient retention time and heating required to react the supply gas can be ensured and a conversion ratio can be more improved. By continuously forming the reaction passageway so as to meander up and down, the size of the entire reaction vessel can be reduced and also heat dissipation of the entire reaction vessel can be reduced.

In this case, each of the flow penetration sections may be a through-hole formed on the reaction tubular wall or a notch and the like formed at the upper end portion or the lower end portion of the reaction tubular wall. The gas supply section may be a gas supply pipe and the gas discharge section may be a gas discharge pipe.

The apparatus for producing trichlorosilane of the present invention may be provided with a plurality of gas discharge sections, and the gas supply section may be in communication with the innermost small space of the plurality of small spaces and the plurality of gas discharge sections may be connected to the outermost small space.

In this apparatus for producing trichlorosilane, since the gas supply section is in communication with the innermost small space of the reaction passageway and the plurality of gas discharge sections are connected to the outermost small space, it is possible to increase the cooling effect by dividing the discharge of the reaction product gas in a high-temperature state between a plurality of gas discharge sections and to rapidly cool the reaction product gas by enabling heat exchange between the outside and a plurality of places. In other words, in the conversion reaction of silicon tetrachloride into trichlorosilane, although a reverse reaction where trichlorosilane returns to silicon tetrachloride occurs if the reaction product gas to be discharged is not cooled rapidly, the rate of conversion into trichlorosilane can be improved by rapidly cooling the reaction product gas through discharging from the plurality of gas discharge sections. Particularly in the case of a structure in which heating is performed from the outside of the reaction vessel using a heating mechanism, the rapid cooling operation can be obtained more effectively by rapidly cooling the reaction product gas in a highest-temperature state at the plurality of gas discharge sections.

Furthermore, the apparatus for producing trichlorosilane of the present invention may be provided with a storage container that stores the reaction vessel and the heating mechanism, and may be provided with an argon supply mechanism that supplies argon to the storage container. Since argon is supplied in the storage container by the argon supplying mechanism in this apparatus for producing trichlorosilane, leakage of the supply gas and the reaction product gas from the reaction vessel can be prevented by the periphery of the reaction vessel being in a pressurized state by argon. Thus, it is possible to prevent the reaction of the supply gas and the reaction product gas which have leaked from the reaction vessel with carbon used in the reaction mechanism and the like on the outside of the reaction vessel.

The members that form the reaction vessel of the apparatus for producing trichlorosilane may be formed of carbon.

The surface of the carbon of the apparatus for producing trichlorosilane may be coated with silicon carbide. Since the reaction vessel is formed of carbon coated with silicon carbide (SiC) in this apparatus for producing trichlorosilane, the production of impurities such as methane, methylchlorosilane, silicon carbide, and the like by the reaction of carbon with hydrogen, chlorosilane and hydrogen chloride (HCl) in the supply gas and the reaction product gas can be prevented and thus a highly pure trichlorosilane can be obtained.

According to the present invention, the following effects are exerted.

According to the apparatus for producing trichlorosilane, since the flow penetration sections are alternately formed in upper portions and lower portions of a plurality of reaction tubular walls in order from the inside, when the flow direction of the gas changes repetitively and alternately between downward direction and upward direction, the long reaction passageway is ensured in the reaction vessel and also the heat conducting area increases on a plurality of reaction tubular walls. Therefore, a long reaction passageway can be ensured without increasing the size of the entire reaction vessel, and also sufficient retention time and heating required to react the supply gas can be ensured and a conversion ratio to trichlorosilane can be more improved.

BEST MODE FOR CARRYING OUT THE INVENTION

An embodiment of the apparatus for producing trichlorosilane of the present invention will be described below with reference to FIG. 1 or 2.

Figure 1:
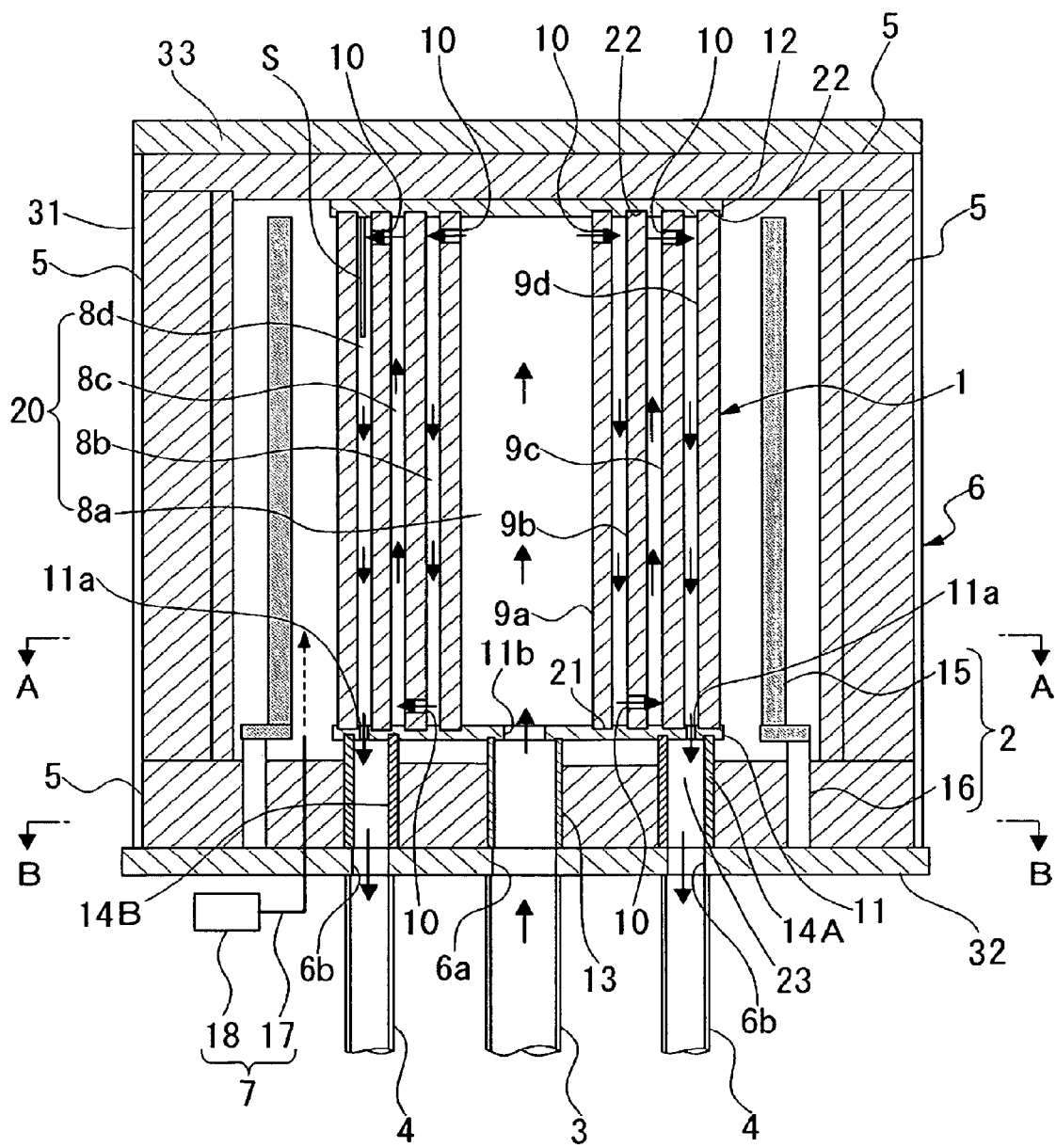
FIG. 1 is a schematic sectional view showing an embodiment of an apparatus for producing trichlorosilane of the present invention.

As shown in FIG. 1, the apparatus for producing trichlorosilane of the present embodiment includes a reaction vessel 1 in which a supply gas containing silicon tetrachloride and hydrogen is supplied to produce a reaction product gas containing trichlorosilane and hydrogen chloride by conversion reaction; a heating mechanism 2 disposed in the periphery of the reaction vessel 1 for heating the reaction vessel 1; a gas supply pipe 3 for supplying the supply gas in the reaction vessel 1; a plurality of gas discharge pipes 4 for discharging the reaction product gas from the reaction vessel 1 to the outside; a heat insulating material 5 disposed so as to cover the periphery of the reaction vessel 1 and the heating mechanism 2; a storage container 6 for storing the reaction vessel 1, the heating mechanism 2 and the heat insulating material 5; and an argon supplying mechanism 7 for supplying argon (Ar) in the storage container 6.

Figure 2:
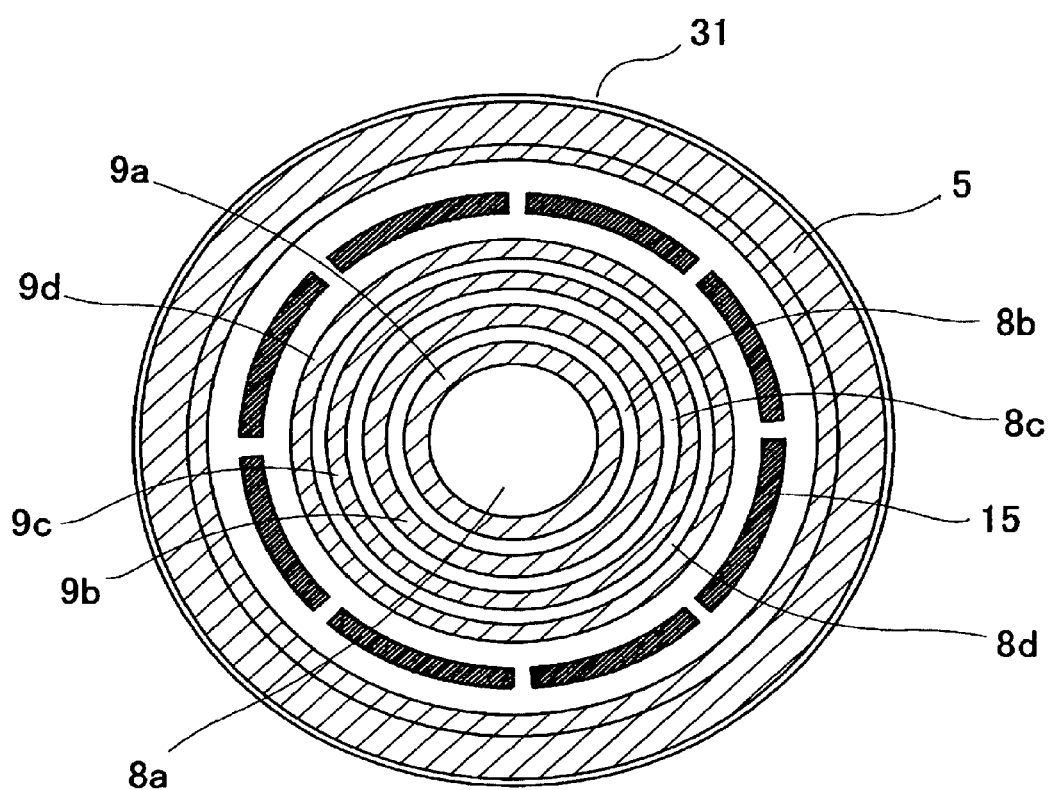
FIG. 2 is a sectional view taken along lines A-A in FIG. 1.

As shown in FIGS. 1 and 2, in order to partition the inner space into a plurality of small spaces 8a to 8d, the reaction vessel 1 is provided with cylindrical first to fourth reaction tubular walls 9a to 9d which have different inner diameter. In other words, by the first to third three reaction inner walls 9a to 9c, the space (space which is more inside of the outermost fourth reaction tubular wall 9d) in the reaction vessel 1 is partitioned into one columnar small space 8a in the center and three tubular small spaces 8b to 8d outside the center. The gas supply pipe 3 is in communication with the lower portion of the columnar small space 8a inside the innermost first reaction tubular wall 9a. The gas discharge pipes 4 are connected to the outermost small space 8d.

Flow through-holes 10 are alternately formed in upperportions and lower portions of these first to third reaction tubular walls 9a to 9c in order from the inside. In other words, a plurality of through-holes 10 are formed in an upper portion of the first reaction tubular wall 9a in a circumferential direction, while a plurality of flow through-holes 10 are formed in an lower portion of the second reaction tubular wall 9b in a circumferential direction. A plurality of flow through-holes 10 are formed in an upper portion of the third reaction tubular wall 9c in a circumferential direction. Thus, a reaction passageway 20 in which small spaces 8a to 8d are in a communication state in order from the inside is formed by these flow through-holes 10.

Therefore, it is set so that the supply gas supplied to the small space 8a inside the first reaction tubular wall 9a, while being heated, becomes a reaction product gas by reaction while sequentially flowing to the outer small spaces 8b to 8d via a plurality of flow through-holes 10. Also, by the gas flowing between the flow through-holes 10 disposed alternately in upper portions and lower portions of the reaction tubular walls in order from the inside, it is set so that the flow direction of the gas repetitively changes to the upward direction and the down ward direction. In the drawing, the flow direction of the gas is indicated by arrow.

The first to fourth reaction tubular walls 9a to 9d are supported in a state where the lower portions are fit in a ring-shaped grooves 21 on the upper surface of the lower supporting circular plate 11 and the upper portions are fit in a ring-shaped grooves 22 on the lower surface of the upper supporting circular plate 12. The upper portion of the upper supporting circular plate 12 is fixed to the heat insulating material 5 on the reaction vessel 1.

The lower supporting circular plate 11 is provided with a central hole 11b and the small space 8a inside the first reaction tubular wall 9a is in communication with the gas supply pipe 3 via the central hole 11b.

Figure 3:
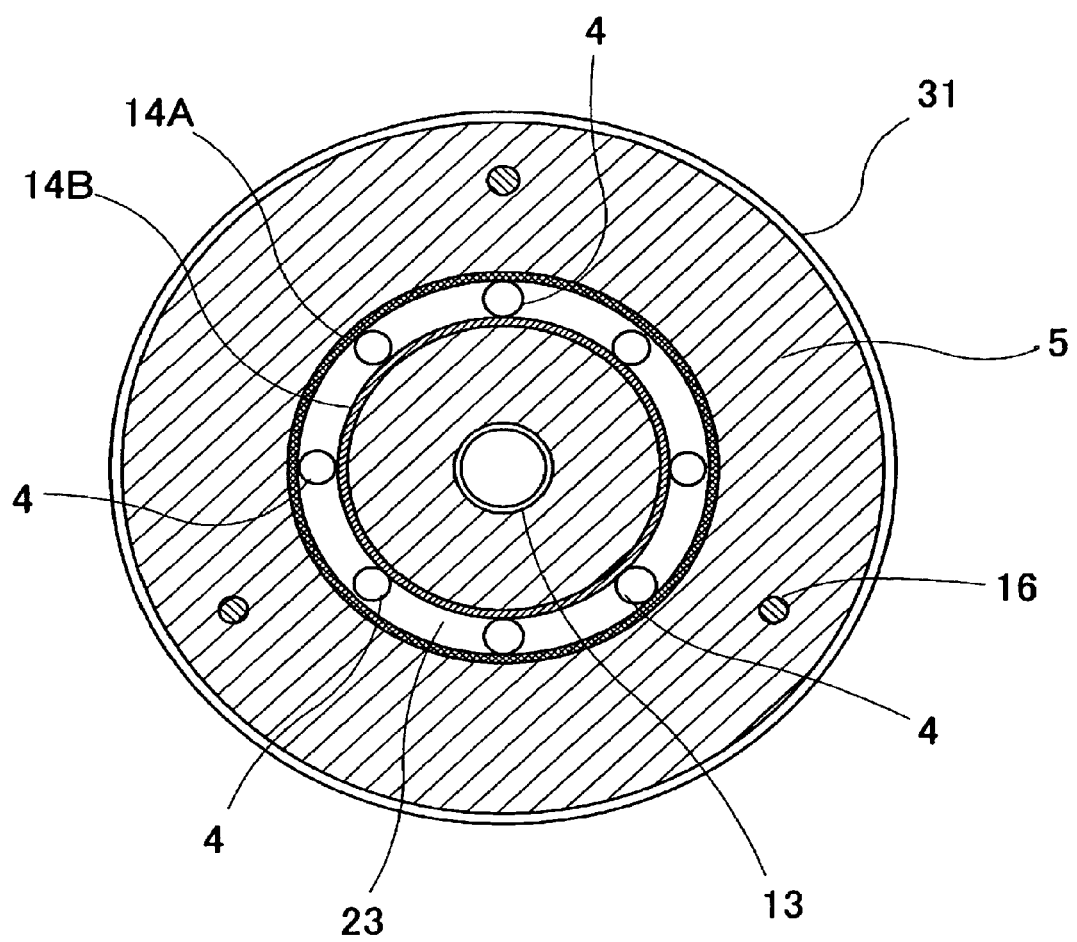
FIG. 3 is a sectional view taken along lines B-B in FIG. 1.

The gas supply pipe 3 and the gas discharge pipe 4 are in communication with a supply hole 6a and a discharge hole 6b formed in the bottom of the storage container 6 respectively, while the top ends are fixed to the bottom of the storage container 6. A supply connection pipe 13 is disposed in a central portion of the reaction vessel 1 by penetrating the heat insulating material 5 in the bottom of this reaction vessel. As shown in FIGS. 1 and 3, two tubular bodies 14A and 14B which penetrate the heat insulating material 5 are disposed in concentricity with this supply connection pipe 13. A tubular discharge connection passageway 23 is formed between these tubular bodies 14A and 14B. The upper end openings of the supply hole 6a and the discharge hole 6b are in communication with the lower end openings of the supply connection pipe 13 and the discharge connection passageway 23 respectively. Tops of tubular bodies 14A and 14B forming the discharge connection passageway 23 are fixed to the lower portion of the lower supporting circular plate 11, and the discharge connection passageway 23 is connected to the outermost small space 8d (inside of the outermost fourth reaction tubular wall 9d) via the outer through-holes 11 a of the lower supporting circular plate 11. Also, the upper end opening of the supply connection pipe 13 is fixed to the lower center of the lower supporting circular plate 11, and then connected to the small space 8a on the inside of the first reaction tubular wall 9a via the centeral through-hole 11b of the lower supporting circular plate 11.

As shown in FIG. 3, eight of the gas discharge pipes 4 are disposed at equal intervals in the circumferential direction of the discharge connection passageway 23.

A supply source (not shown) of the supply gas is connected to the gas supply pipe 3. Although the reaction product gas is discharged from the gas discharge pipe 4 to the outside by the pressure difference in the pipe, a discharge pump may be connected to the gas discharge pipe 4.

With respect to each of the members forming the reaction vessel 1, in this embodiment, the first to fourth reaction tubular walls 9a to 9d, the lower supporting circular plate 11 and the upper supporting circular plate 12, and the like are formed of carbon and the surface of the carbon is coated with silicon carbide.

The storage container 6 is constituted of a tubular wall 31, and a bottom plate 32 and a ceiling plate 33 which block both ends thereof, and is made of stainless steel.

The heating mechanism 2 is provided with a heater 15, which is a heating element, in the periphery of the reaction vessel 1 so as to enclose the reaction vessel 1 and with an electrode 16, which is connected to the bottom of the heater 15 and is for flowing an electric current to the heater 15. This electrode 16 is connected to a power supply (not shown). The heater 15 is formed of carbon. The heating mechanism 2 carries out heating control so that the temperature inside the reaction vessel 1 becomes a temperature in the range from 800 to 1,400° C. If the temperature inside the reaction vessel 1 is set to 1,200° C. or higher, the conversion ratio is improved. Also, disilanes may be introduced to recover silanes.

The heat insulating material 5 is formed of, for example, carbon, and is fixed to the inner wall surface of the tubular wall 31, the upper surface of the bottom plate 32, and the lower surface of the ceiling plate 33 of the storage container 6 so as to be pasted inside the storage container 6.

The lower supporting circular plate 11 of the reaction vessel 1 is disposed in a state where it floats from the heat insulating material 5 (heat insulating material on the bottom plate section 32 of the storage container 6) disposed thereunder, forming a interstitial heat insulation space.

A temperature sensor S which protrudes into the outermost small space 8 in the reaction passageways 20 is fixed to the lower surface of the upper supporting circular plate 12. The temperature is controlled by the heating mechanism 2 while the temperature is measured by this temperature sensor S.

The argon supply mechanism 7 is provided with an argon supply pipe 17, the tip end thereof protruding into the storage container 6 by penetrating the bottom of the storage container 6 and the heat insulating material 5, and with an argon supply source 18 which is connected to the argon supply pipe 17. This argon supply mechanism 7 carries out argon supply control so that inside space of the storage container becomes a predetermined pressurized state. A container pump (not shown) for carrying out replacement of the inside atmosphere or argon exhaustion is connected to the top of the storage container 6.

In this embodiment, since flow through-holes 10 are alternately formed in upper portions and lower portions of the first to third reaction tubular walls 9a to 9c in order from the inside, the flow direction of the gas repetitively changes between downward direction and upward direction, alternately, every time the gas moves to the outside of the reaction passageway 20. Therefore, the long reaction passageway 20 is ensured in the reaction vessel 1 and the heat conducting area increases on a plurality of the first to fourth reaction tubular walls 9a to 9d, and thus sufficient retention time and heating required to react the supply gas can be ensured and a conversion ratio can be more improved.

By continuously forming the reaction passageway 20 so as to meander up and down, the size of the entire reaction vessel 1 can be reduced and also heat dissipation of the entire reaction vessel 1 can be reduced.

Since the gas supply pipe 3 is in communication with the inner small space 8a of the innermost first reaction tubular wall 9a and the plurality of gas discharge pipes 4 are connected to the outermost small space 8d, it is possible to rapidly cool the reaction product gas in a high-temperature state by discharging through the discharge pipes and making heat exchange between the outside and the plurality of pipes. In other words, by rapidly cooling the reaction product gas by discharging from a plurality of the gas discharge pipes 4, the reverse reaction to convert to silicon tetrachloride is suppressed and thus the conversion ratio can be improved.

Particularly, since the reaction product gas in a highest-temperature state obtained by an external heating mechanism 2 is transferred to the plurality of gas discharge pipes 4 from the outermost small space 8d, the reaction product gas in a highest-temperature state is rapidly cooled in the plurality of gas discharge pipes 4, and thus more rapid cooling operation is obtained and a stable conversion reaction can be obtained.

Also, since argon is supplied to the storage container 6 by the argon supplying mechanism 7, leakage of the supply gas and the reaction product gas from the reaction vessel 1 can be prevented by the periphery of the reaction vessel being in a pressurized state by argon. Thus, it is possible to prevent reaction of the supply gas and the reaction product gas which have leaked from the reaction vessel 1 with carbon used in the heating mechanism 2 and the like outside the reaction vessel 1.

When argon is supplied as a purge gas, since argon is supplied from the bottom of the storage container 6 by the argon supply mechanism 7, natural convection occurs in an upward direction by heating with the heater 15. Also, by suction from a container pump connected to the top of the storage container 6, a high purge effect can be obtained by the purge gas flowing out smoothly from the bottom to the top.

Furthermore, since constituent members (first to fourth reaction tubular walls 9a to 9d, lower supporting circular plate 11 and upper supporting circular plate 12 and the like) of the reaction vessel 1 is formed of carbon coated with silicon carbide (SiC), the production of impurities such as methane, methylchlorosilane, silicon carbide, and the like by the reaction of carbon with hydrogen, chlorosilane and hydrogen chloride (HCl) in the supply gas and the reaction product gas can be prevented, and thus a highly pure trichlorosilane can be obtained.

The technical scope of the present invention is not limited to the above embodiments and various modifications which do not depart from the spirit of the present invention can be added.

For example, while four first to fourth reaction tubular walls 9a to 9d were used in the above embodiments, three or five or more reaction tubular walls may be used. When the number of reaction tubular walls is large, whereas the energy efficiency increases because of the increased heat transfer area, the heating efficiency decreases since it becomes difficult to transfer the radiation heat from the heating mechanism 2 to the inside. Thus, an appropriate number of reaction tubular walls are disposed according to gas flow amount and the size of the entire apparatus.

In the above embodiments, as described above, it is preferable to set that the supply gas is supplied from the innermost side of the reaction passageway 20 in the reaction vessel 1 and gradually flows to the outside through the flow through-holes 10 while changing the flow direction between upward direction and downward direction. Alterenatively, it is possible to set that the supply gas is supplied from the outside and gradually flows to the inside.

Also, a cooling mechanism may be added by forming a refrigerant passageway for the flowing of a refrigerant such as water inside the wall of the storage container 5.

Furthermore, the flow through-holes 10 in both reaction tubular walls which form passageway between cylindrical surfaces of the walls, may be formed in not only up and down positions but in the circumferential direction so as to be dislocated with each other. In this situation, the passageway between the flow through-holes 10 can be made longer. Also, as an alternative to the flow through-holes, flow penetration sections may be constituted of notches formed in the upper end portion or the lower end portion of the reaction tubular walls. The flow penetration sections of the present invention may include both through-holes and notches.

The above-described embodiment employed a constitution that the reaction tubular walls 9a to 9d are fit in the ring-shaped grooves 22 of the upper supporting circular plate 12 and the ring-shaped grooves 21 of the lower supporting circular plate 11. The ring-shaped grooves may not only be ring-shaped grooves having a rectangular cross section as shown in FIG. 1. As an alternative, the reaction tubular walls may be provided with end surfaces having semicircular cross section, and the ring-shaped grooves may have a semicircular cross section.

Each of the ring-shaped grooves has the function of disposing each reaction tubular walls in concentric alignment. As an alternative to forming the ring-shaped grooves, for example, the reaction tubular wall may be placed on the top surface of the lower supporting circular plate and a ring-shaped spacer for restricting a relative positional relation may be interposed between the reaction tubular walls.

INDUSTRIAL APPLICABILITY

According to the apparatus for producing trichlorosilane of the present invention, it is possible to provide an apparatus for producing trichlorosilane in which a long gas passageway can be ensured without increasing the size of the entire apparatus, and also sufficient retention time and heating required to react the supply gas can be ensured and a conversion ratio of silicon tetrachloride to trichlorosilane can be improved.

The invention claimed is:

1. A method for producing trichlorosilane, using an apparatus comprising:
    a reaction vessel in which a supply gas containing silicon tetrachloride and hydrogen is supplied to produce a reaction product gas containing trichlorosilane and hydrogen chloride;
    a heating mechanism including a heater that heats the interior of the reaction vessel, encloses the reaction vessel, and heats the interior of the reaction vessel;
    wherein a reaction passageway is formed in the interior of the reaction vessel, in which a plurality of small spaces partitioned by a plurality of reaction tubular walls that have different inner diameters and are substantially concentrically disposed communicate by flow penetration sections formed alternately in lower portions and upper portions of the reaction tubular walls in order from the inside, and an outlet of the reaction passageway is at an outermost small space,
    a gas supply section which is in communication with the innermost small space of the plurality of small spaces that supplies the supply gas in the reaction vessel, and is formed only at a center of the reaction vessel; and
    a plurality of gas discharge sections which are connected to the outermost small space that discharges the reaction product gas from the reaction vessel to the outside,
    the gas supply section and the gas discharge sections are connected to the reaction passageway, and
    said method comprises a step of supplying gas from the gas supply section, moving the gas from the innermost small space of the plurality of small spaces to the outermost small space, and discharging gas from the gas discharge sections, with the flow direction of the gas repetitively changes between a downward direction and an upward direction every time the gas moves to the outside of the reaction passageway.

2. The method for producing trichlorosilane according to claim 1, using an apparatus comprising:
    a storage container that stores the reaction vessel and the heating mechanism, and an argon supply mechanism that supplies argon in the storage container.

3. The method for producing trichlorosilane according to claim 1, wherein a member forming the reaction vessel is formed of carbon.

4. The method for producing trichlorosilane according to claim 3, wherein a surface of the carbon is coated with silicon carbide.

5. The method for producing trichlorosilane according to claim 2, wherein a member forming the reaction vessel is formed of carbon.

6. The method for producing trichlorosilane according to claim 5, wherein a surface of the carbon is coated with silicon carbide.

7. The method for producing trichlorosilane according to claim 1, wherein a plurality of tubular spaces are formed between the innermost reaction tubular wall and the outermost reaction tubular wall.

8. The method for producing trichlorosilane according to claim 1, wherein the gas discharge sections are disposed concentrically from the gas supply section and disposed to support the reaction vessel.

9. The method for producing trichlorosilane according to claim 2, wherein a space in the reaction vessel is partitioned into a columnar small space at a center and tubular small spaces outside the columnar small space by the plurality of reaction tubular walls; and the gas supply section is connected to the columnar small space and the plurality of gas discharge sections are connected to the outermost tubular small space.

10. The method for producing trichlorosilane according to claim 9, wherein the gas supply section and the plurality of gas discharge sections are located at a bottom of a storage container that stores the reaction vessel and the heating mechanism.

* * * * *